United States Patent [19]

Cho

[11] 4,235,019
[45] Nov. 25, 1980

[54] SELFCENTERED AUTOMATIC COORDINATE MEASURING MACHINE

[76] Inventor: Chi L. Cho, Feldblumenweg 47, Zurich, Switzerland, 8048

[21] Appl. No.: 962,995

[22] Filed: Nov. 22, 1978

Related U.S. Application Data

[63] Continuation of Ser. No. 853,443, Nov. 21, 1977, abandoned.

[30] Foreign Application Priority Data

Nov. 20, 1976 [CH] Switzerland .................... 14678/76
Nov. 3, 1977 [CH] Switzerland .................... 13487/77

[51] Int. Cl.³ ............................................... G01B 5/20
[52] U.S. Cl. .......................... 33/174 TA; 33/180 R; 33/169 C
[58] Field of Search ............. 33/174 R, 174 TA, 1 M, 33/174 TC, 174 TD, 174 L, 169, 191, 180 R

[56] References Cited

U.S. PATENT DOCUMENTS

| | | | |
|---|---|---|---|
| 1,008,842 | 11/1911 | Mair | 33/178 R |
| 3,210,855 | 10/1965 | Carter et al. | 33/191 |
| 3,352,021 | 11/1967 | Leach et al. | 33/174 R |
| 3,816,930 | 6/1974 | Edenholm | 33/174 TA |
| 3,829,978 | 8/1974 | Basin et al. | 33/174 TA |

*Primary Examiner*—Harry N. Haroian
*Attorney, Agent, or Firm*—Sixbey, Friedman & Leedom

[57] ABSTRACT

Apparatus for precisely positioning a workpiece in a measuring machine having a pair of intersecting reference axes by using first and second physically identifiable workpiece reference points positioned at known locations relative to a workpiece zero line. The apparatus includes a clamp plate (20) on which the workpiece may be mounted, a bearing structure (36,37) for supporting the clamp plate (20) for uniplanar motion and a centering pin and carrier (60) for constraining the clamp plate to pivot about one of the workpiece reference points. A centering spindle (7) supported on the machine may be used to locate accurately the workpiece reference points and thereby to position accurately the workpiece zero line relative to the intersecting reference axes of the measuring machine.

18 Claims, 30 Drawing Figures

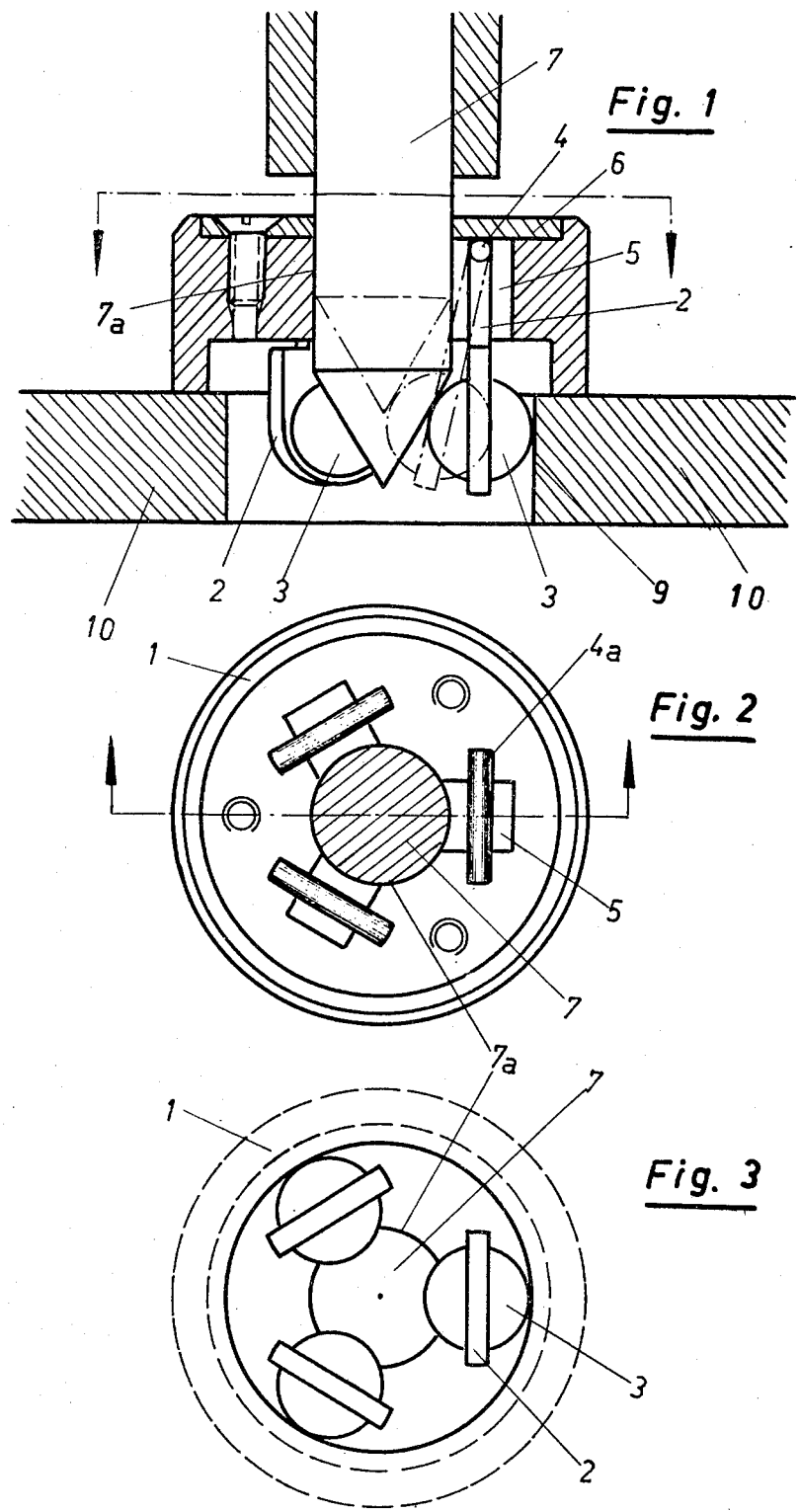

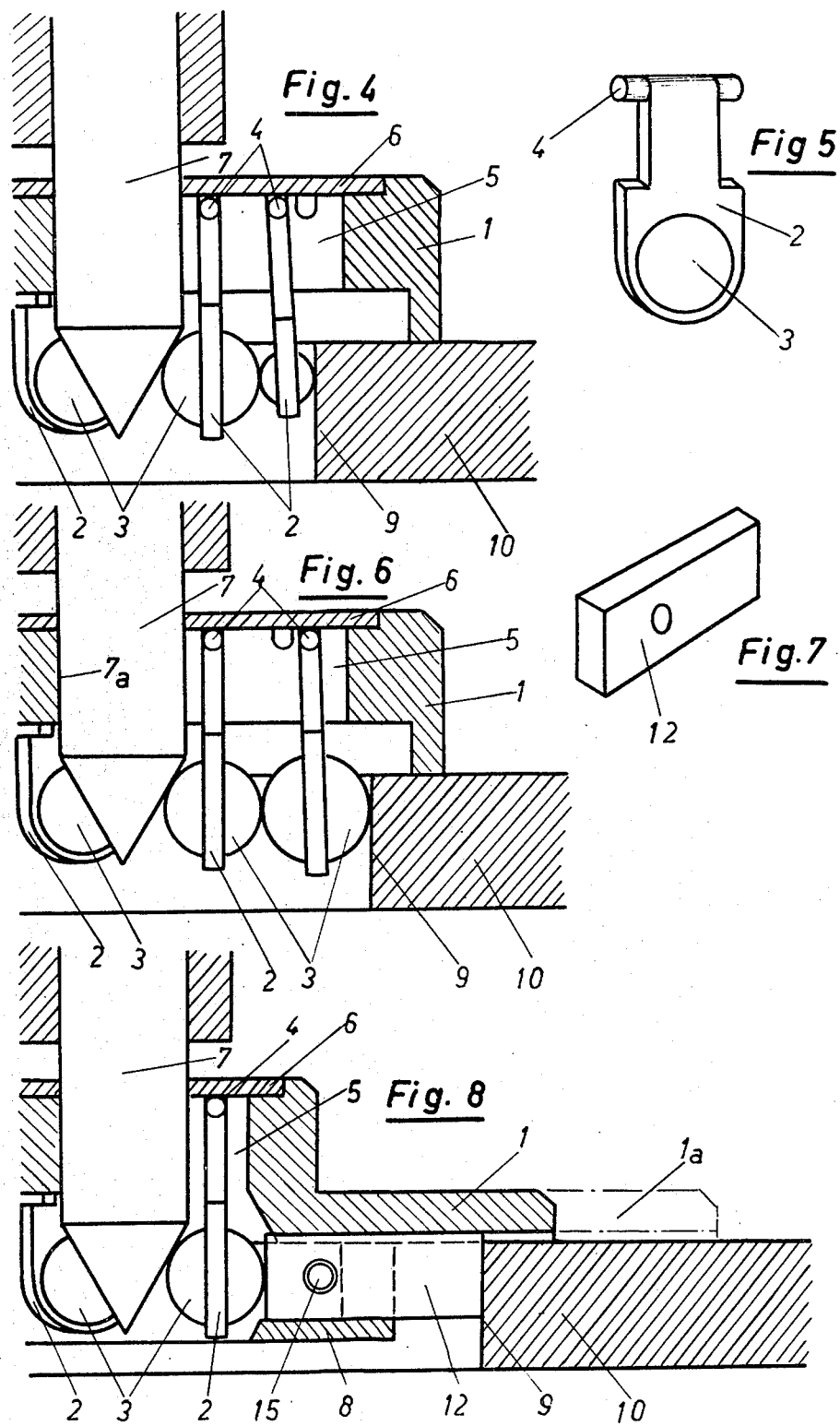

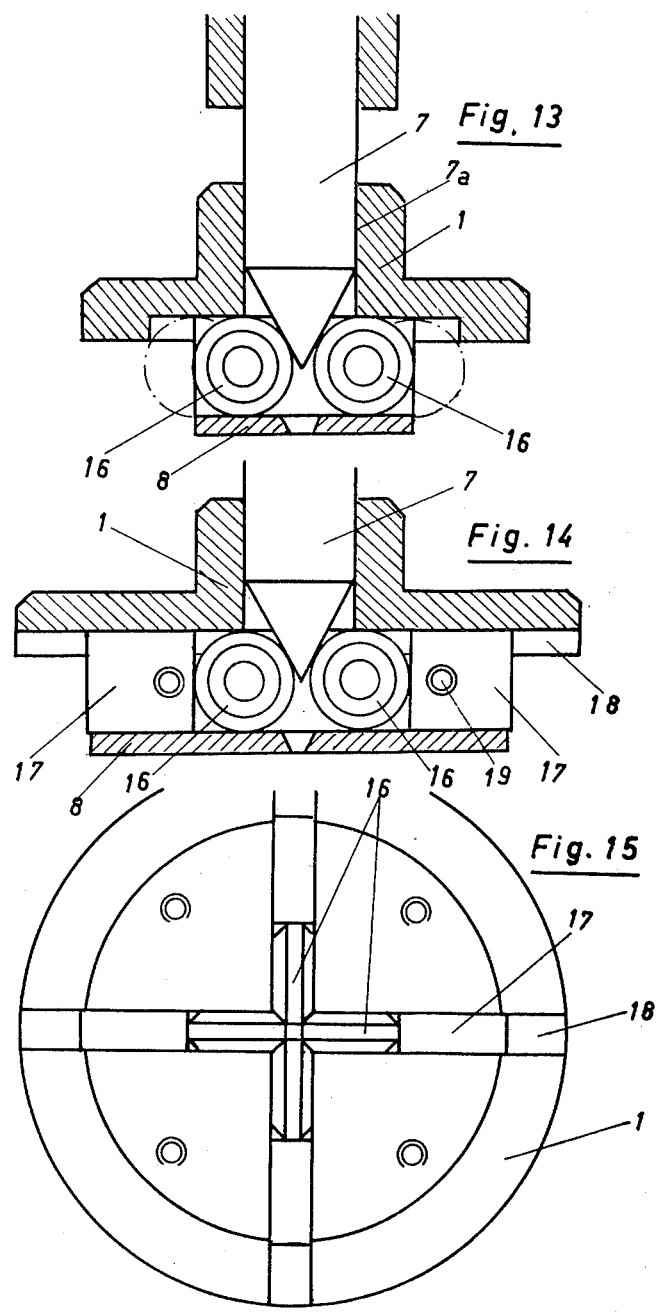

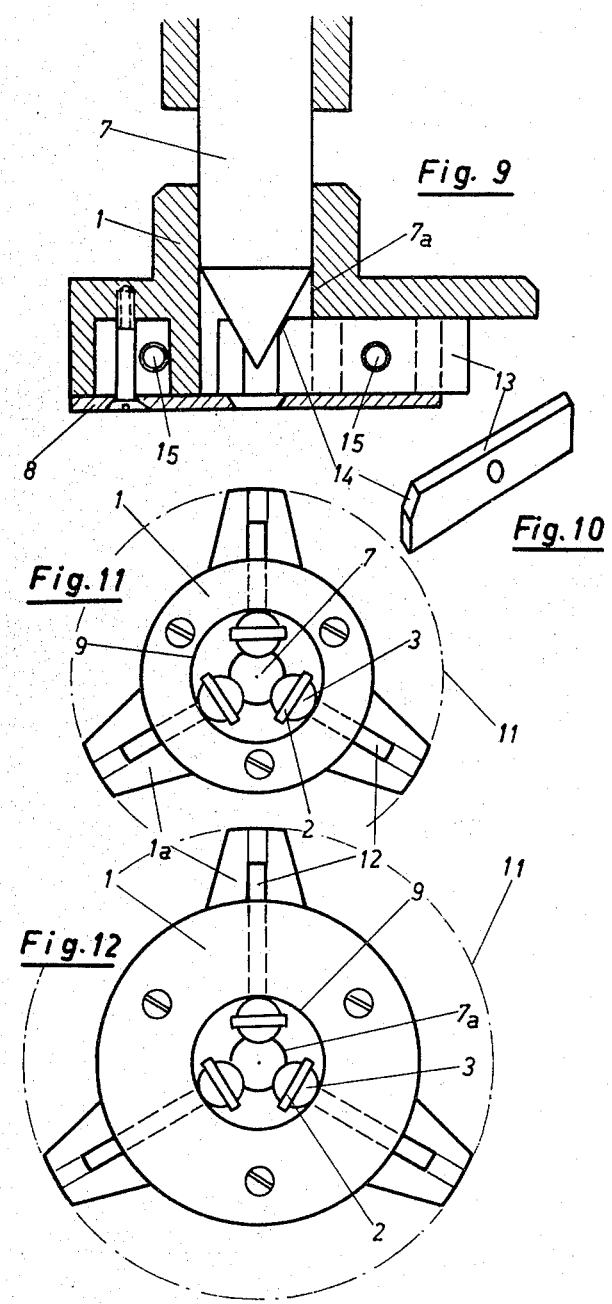

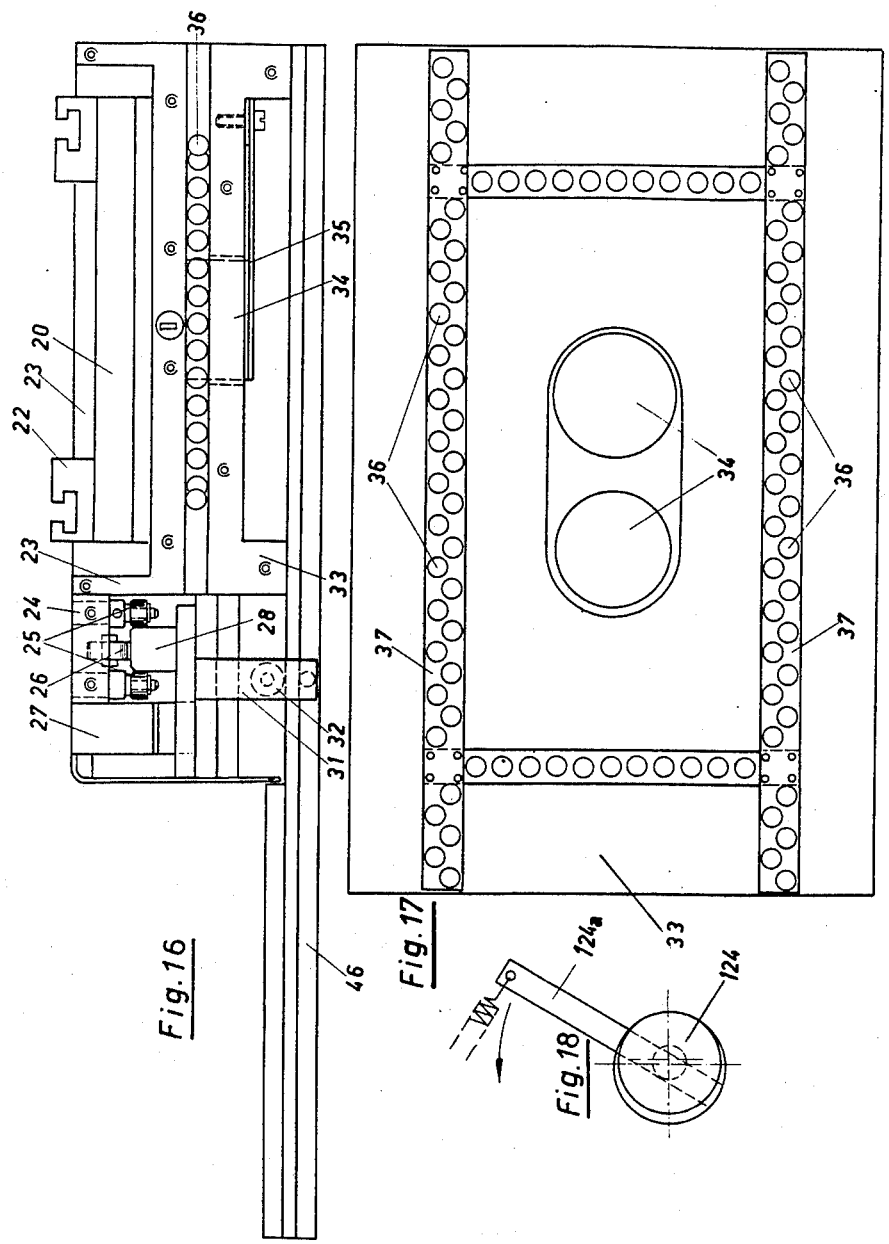

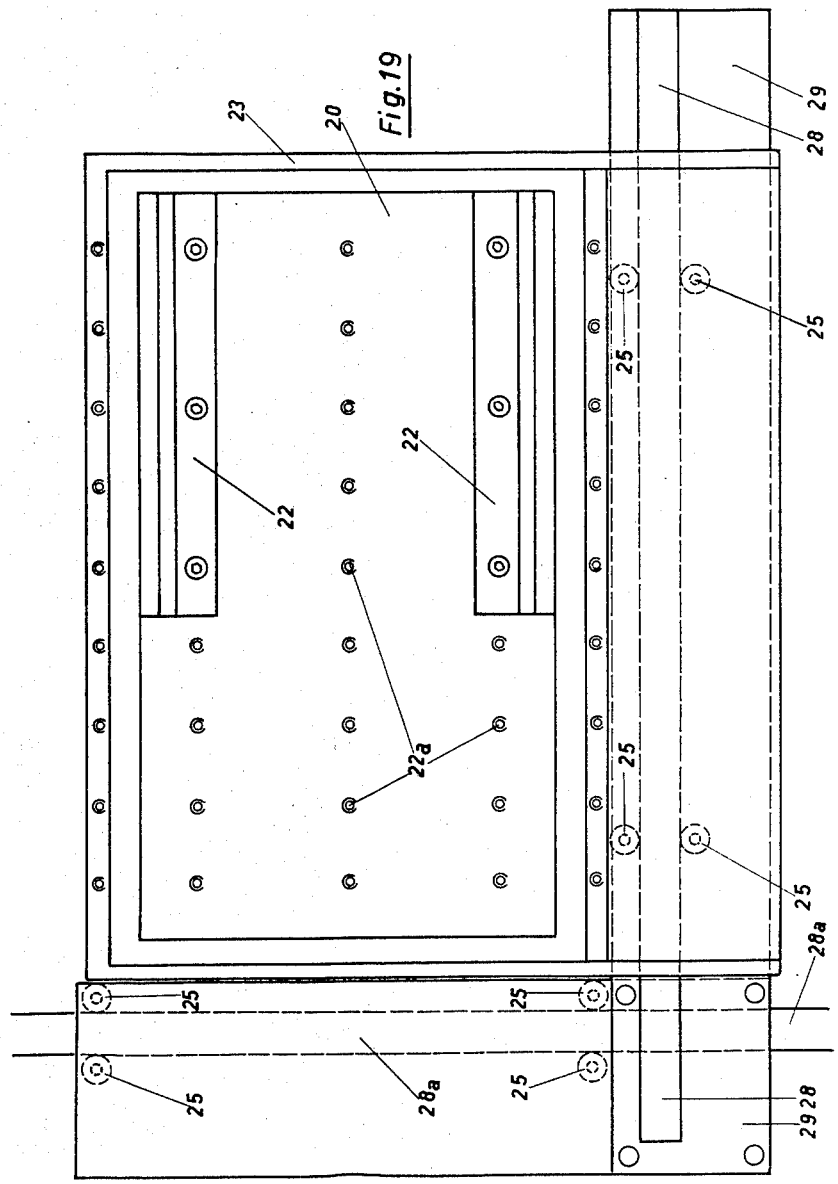

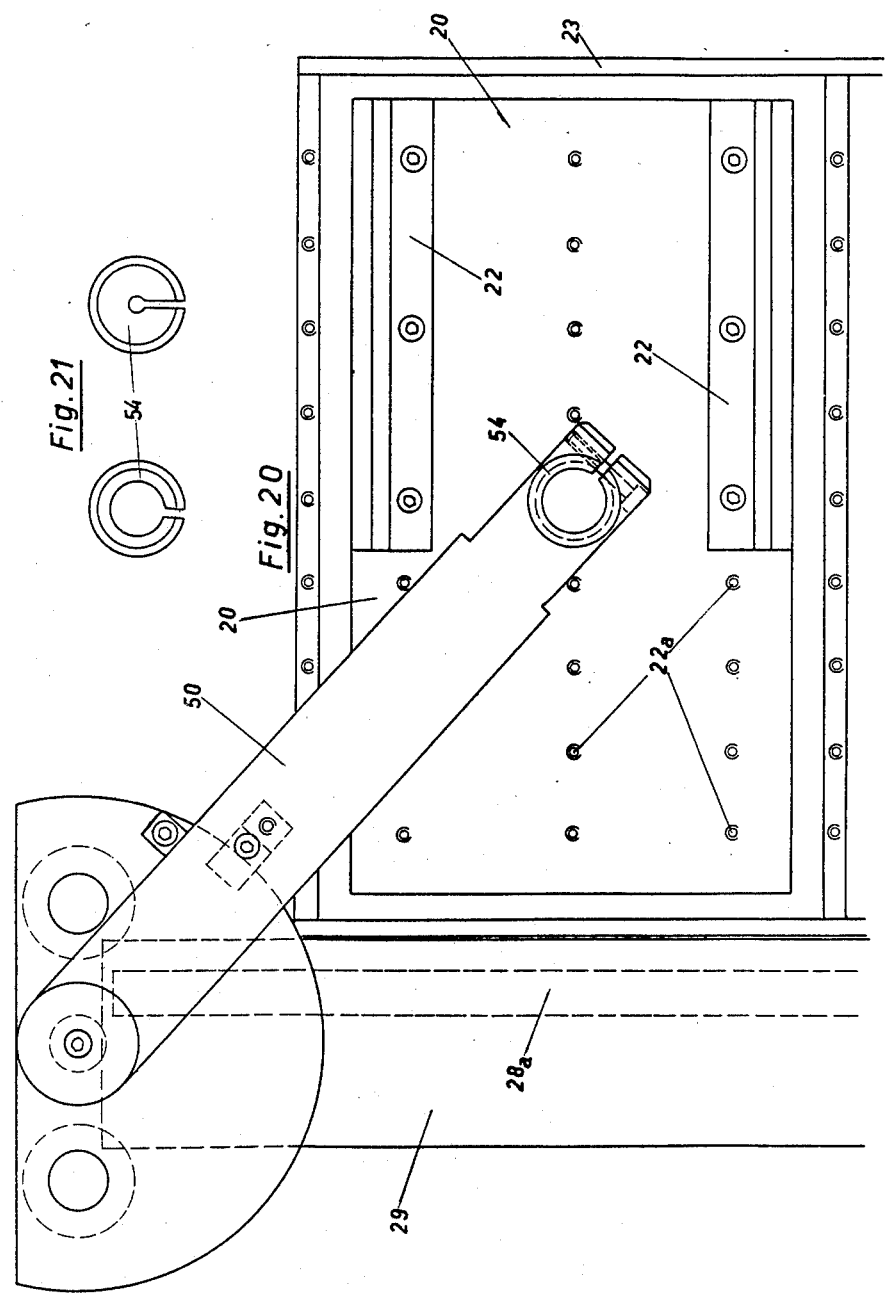

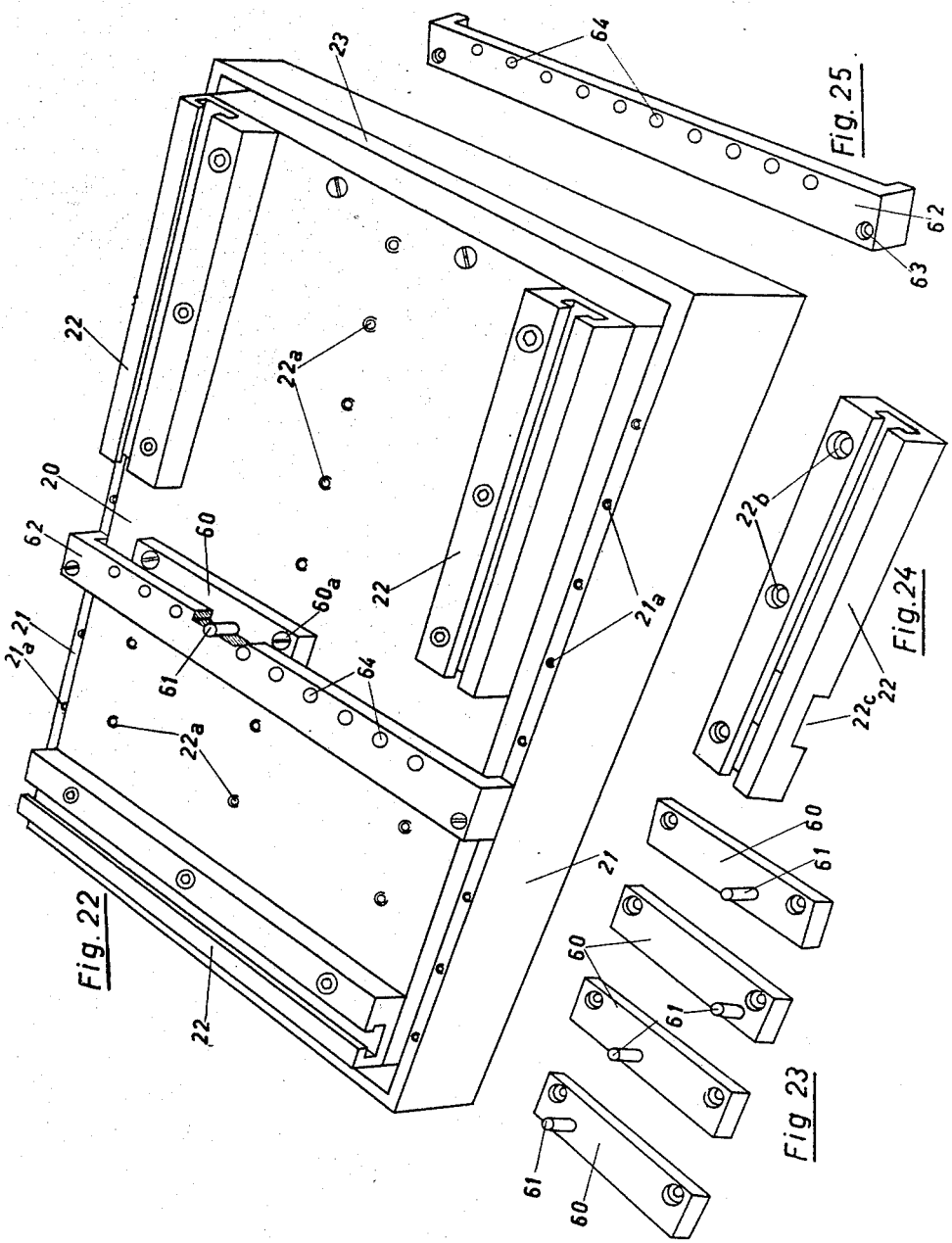

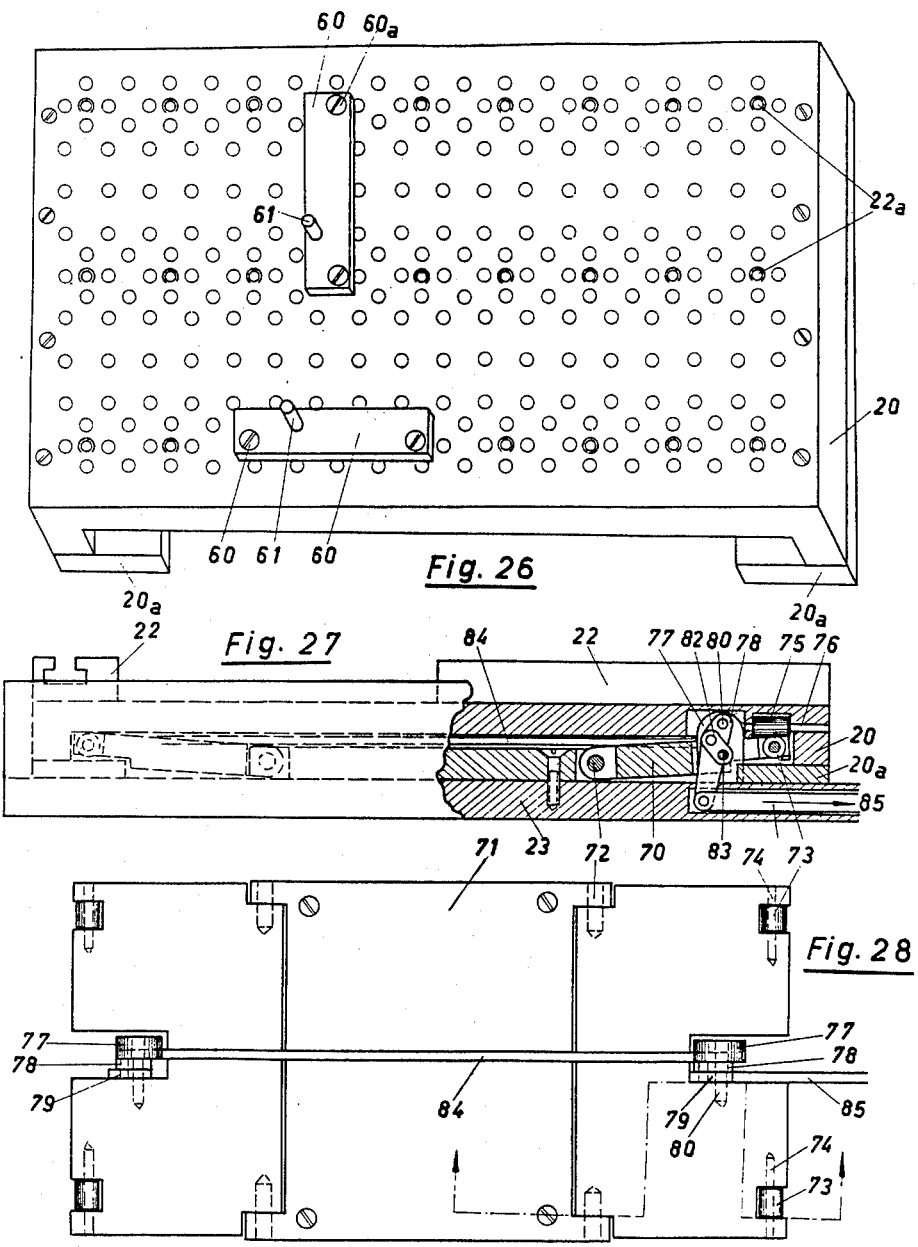

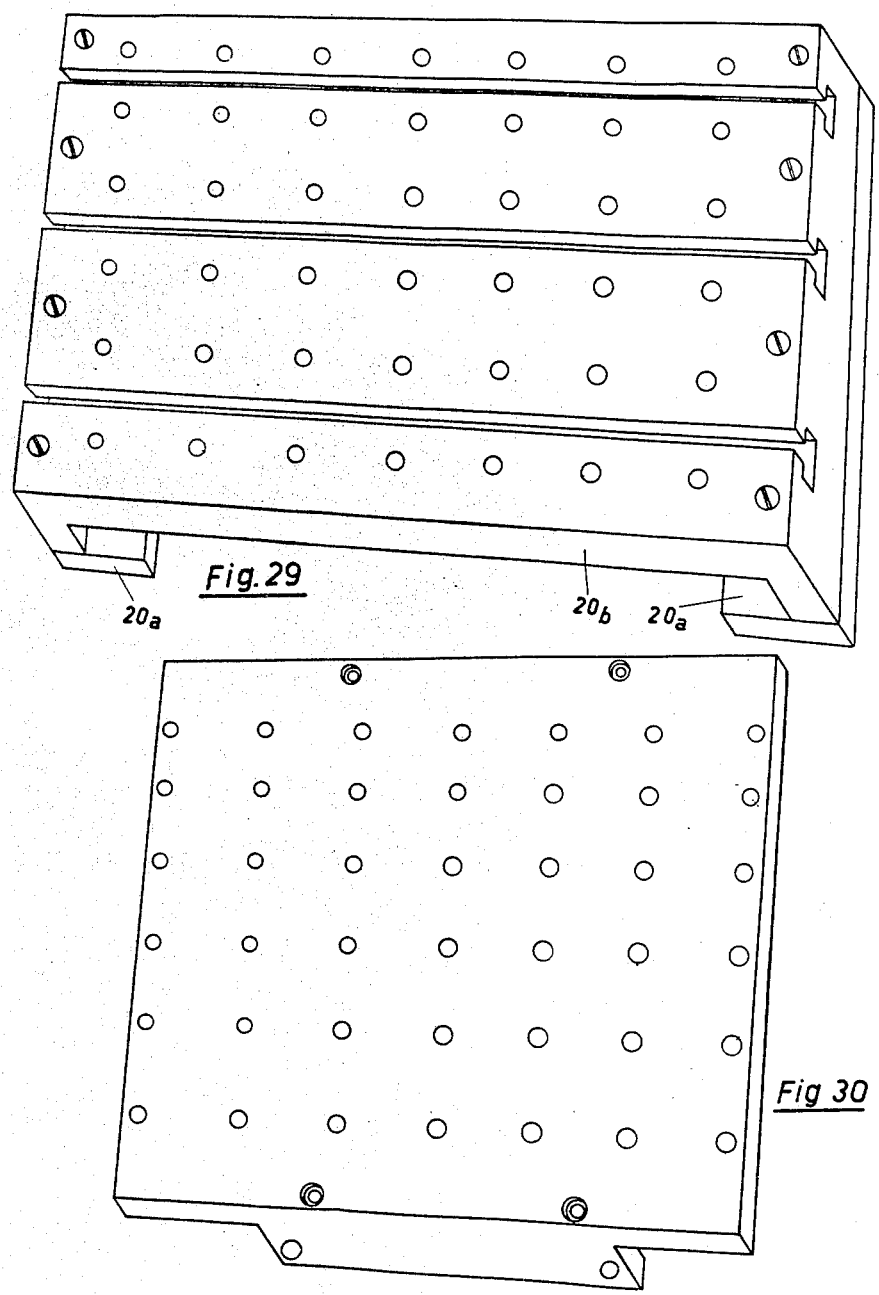

SELFCENTERED AUTOMATIC COORDINATE MEASURING MACHINE

This is a continuation of application Ser. No. 853,443, filed Nov. 21, 1977, now abandoned.

BACKGROUND OF THE INVENTION

1. Field of the Invention

The present invention relates to measuring and positioning machines for orienting workpieces and, more particularly, to self-centering automatic coordinate measuring forms of such machines.

2. Description of the Prior Art

Rapid, zero-positioned measuring machines are currently widely distributed. However, such machines show two significant flaws. First is the problem of centering the boreholes to be measured. Second is the problem of setting the coordinate zero line for the object to be measured.

In conventional prior art measuring machines, measuring rolls are utilized for measuring distances of axes to center boreholes. In order that the roller-cone employed can be kept as small as possible, its measuring cone is of very elongated form. For boreholes or rackholes which are non-continuous, such measuring cones, in most cases, are not able to adequately perform the measuring work. Furthermore, such measuring cones are only able to contact the edge of the hole or the hole facets. However, hole facets are generally imprecisely worked. It therefore is impossible to perform precise centering with this type prior art method. In expensive measuring-machines, the centering of the borehole is achieved by scanning the walls of the borehole using star-scanners and the center location is established and held by means of a computer. This method, however, is very complicated and costly.

The art has not yet provided a direct solution for automatically adjusting the initial zero line of a piece to be measured to that of the measuring axis of the coordinate table. Most workpieces have no precise-measuring stop line. In general, the workpiece is placed in a more or less (that is angularly offset) position on the measuring table. One first locates an initial zero point and then locates a second reference point or a reference line which should be parallel to the measuring axis. This is either manually accomplished or is done by means of knocking the workpiece, which is very difficult and time-consuming. This is because once the measuring spindle has been adjusted to the initial point of the workpiece, it must be moved away therefrom in order to locate the second reference point or reference line. When this happens, the released initial point can thereby again be displaced. Thus, the adjusting phase develops into a forward and backward motion as a result of which it is very difficult to obtain satisfactory precisioning. Moreover, should there develop an error in locating the initial line of the workpiece relative to the measuring axis of the measuring table, then the entire measuring becomes illusory. In expensive measuring machines, the workpieces may be placed at any tilted angle onto the measuring table. However, the tilted angle is established by a computer by means of two reference points and the entire mis-measurement can be computed and corrected on a trigonometric basis. Nevertheless, to correct these consciously-made wrong measurements in toto is basically illogical and such methods do not represent a direct or satisfactory ideal solution. Aside from the involved handling, which is not secure from errors by untrained persons, the most compelling disadvantage is that it is economically prohibitive to utilize a computer in relation to this simple measuring task.

SUMMARY OF THE INVENTION

An object of the instant invention is to provide a measuring machine which overcomes the disadvantages of prior machines requiring extensive and involved handling which is subject to error.

It is another object of the invention to provide a machine able to obtain direct measurements without the need for a computer.

In accordance with the aforesaid objects, an automatic centering device and automatic coordinator are provided, which are functionally inseparable, and only by means of their mutual cooperation is it possible to directly perform measuring task without the aid of complicated computations.

The details of construction and use of the instant invention will become more apparent from the description which follows. However, it is a major characteristic of the instant invention that it includes an automatic centering device which is provided with a cover lid extending beyond the diameter of the borehole to be measured, and cooperating with at least three pivotable or tiltable balls or free-rolling rollers which are mounted on said cover lid, so that the balls or rollers, during the guided insertion of a conically tipped centering spindle through the centering hole, are evenly pressed onto the walls of the bore hole. It is another major characteristic of the invention that it includes a clamping platform provided with a multitude of selectable and adjustable coordinate centers which cooperate with a base table also provided with a multitude of correspondingly arranged coordinate centers, in a manner such that the elected center in the clamping platform and in the base table may be at first pinned to each other, yet the clamping platform may be moved, e.g., upwards and downwards, on the base table by means of a lever system. This permits the clamping platform to be moved around the elected center in a floating state to perform the necessary angle-correction for the object to be measured, and to then be placed in a fixed state relative to the base table to be available for performing the measurement.

BRIEF DESCRIPTION OF THE DRAWINGS

The invention will be better understood from the following description and claims considered together with the accompanying drawings in which:

FIG. 1 illustrates a sectional view through a centering device of the invention disposed in the center position of the borehole of a workpiece;

FIG. 2 is a top plan view of a centering device with the centering spindle cut-through and the lid removed;

FIG. 3 is a bottom plan view seen through the borehole of the workpiece;

FIG. 4 illustrates a sectional view through a centering device of the invention showing use of a double row of tiltable or pivotable balls;

FIG. 5 illustrates in perspective a tiltable or pivotable ball;

FIG. 6 illustrates a sectional view through a centering device having a double row of larger tiltable or pivotable balls;

FIG. 7 illustrates in perspective a wedge-shaped scanner;

FIG. 8 illustrates a sectional view of a centering device showing the cooperation between the centering spindle, the tiltable ball and the wedge-shaped scanner;

FIG. 9 illustrates a sectional view of a centering device showing the cooperation between the centering spindle directly with the wedge-shaped scanner;

FIG. 10 illustrates in perspective another form of wedge-shaped scanner;

FIG. 11 illustrates a bottom plane view of a larger form of centering device showing an enlarged border-formation;

FIG. 12 illustrates another embodiment of FIG. 11;

FIG. 13 illustrates a sectional view showing a centering device using a freely-rolling roller;

FIG. 14 illustrates a sectional view showing a centering device using a free-rolling roller and a wedge-shaped scanner;

FIG. 15 illustrates a bottom plan view, with lid removed, of the FIG. 14 embodiment;

FIG. 16 illustrates a side elevational view of the measuring machine of the present invention for use in combination with the centering devices disclosed in FIGS. 1–15;

FIG. 17 illustrates the lower roll-table of the measuring machine, showing use of magnetic plates;

FIG. 18 illustrates the eccentric for the guide bearings;

FIG. 19 illustrates a top plan view of a measuring machine;

FIG. 20 illustrates a top plan view of a measuring machine, showing same with a rotatable measuring spindle sleeve;

FIG. 21 illustrates two bushing holders;

FIG. 22 illustrates in perspective view a base table with the clamping platform mounted thereon;

FIG. 23 illustrates in perspective view four centering pin supports used on the FIG. 22 embodiment;

FIG. 24 illustrates in perspective view the removable T-slot block used on the FIG. 22 embodiment;

FIG. 25 illustrates in perspective view the fixing bridge used on the FIG. 22 embodiment;

FIG. 26 illustrates diagrammatically the selectable possibilities for starting centers;

FIG. 27 illustrates in partial sectional view a lever system for controlling the movement of the clamping platform above the base table;

FIG. 28 illustrates a top plan view of said lever system;

FIG. 29 illustrates a typical clamping plate showing pre-determined boreholes as a selective starting center for coordinates;

FIG. 30 illustrates an intermediate plate of the base table showing predetermined boreholes as selective starting centers for coordinates.

DETAILED DESCRIPTION OF THE INVENTION

Turning to an explanation of the present invention, the centering device aspects of the present invention are most clearly seen in FIGS. 1–15. FIGS. 1 to 9 show various embodiments of centering devices for from small up to increasingly larger boreholes. For smaller boreholes there will suffice a set of tiltable or pivotable balls 3 or rolling rollers 16. In larger boreholes there are utilized additional sets of tiltable or pivotable rollers. In still larger boreholes, in addition to a set of tiltable rollers or a free-rolling roller, there are additionally utilized a set of longer wedgeshaped scanners, e.g., 12, 17. The centering area for various sizes of boreholes is commonly established as 10 mm each, in smaller ones as 5 mm, and, below 5 mm, centering is accomplished using the pointed centering spindle directly. Centering devices for smaller boreholes, for example as shown in FIGS. 1, 2, 3, 4 or 6 are constructed in the form of a cylinder head as a cover lid 1. For larger boreholes, for example as shown in FIGS. 8, 9, 11 and 12, the cylinder head frequently extends in a widened flange shown in the form of a round disk (as in the broken line 1a) or in a starshape.

The functioning of the centering device of the present invention is generally as follows. In the measuring of two boreholes, the centering is selected according to the size of the borehole. The centering device is placed on top of the first borehole. The centering device may be mounted in a measuring machine, which may be combined with a boring machine, and is connected with a digital indicator which can rapidly be placed to zero. The details of the measuring machine (is described more fully hereinafter). The centering device includes a measuring spindle which is also called a centering spindle 7, and may be mounted on the measuring machine as well as on the boring machine. During the measuring phase, the measuring spindle 7 is guided into a centering hole 7a formed in cover lid 1. The measuring spindle 7 has a pointed, cone-shaped end portion. Which contacts the balls 3 which are tiltably or pivotally positioned on the pivot point 4 in the housing by means of lever 2. As the conical end of the spindle is lowered, the balls are forced outwardly and generally evenly in three directions onto the wall of the borehole 9 of the workpiece 10. The workpiece, which is fastened on a clamping platform, is floating by means of ball bearings (as is described more fully hereinafter), and the borehole thereof is thereby forced to obtain the same center point as that of the measuring spindle. The process of centering the second borehole takes place in the same manner. The distance between the center points of the two boreholes is established by displacing the clamping table by means of the digital indicator. In a simplified embodiment of the centering device, the tiltable balls 3 can be replaced with rolling rollers 16 (see FIGS. 13–15). The rollers roll directly on the base-lid 8 and are guided in slots 18. Stop means are provided in the housings of smaller diameter units in order to prevent the rollers from falling out of their position. For larger diameters, the rollers 16 are provided with lengthened scanners 17 (FIGS. 14, 15). The longer scanners are always pulled inwards by means of circular pull-springs. The rollers have the advantage that they require little space. Instead of being arranged in three directions, they may be arranged in four directions, as shown in FIGS. 13, 14, 15, whereby it is possible to obtain a more precise centering.

The measuring machine employing one of the centering devices of FIGS. 1–15, in connection with the automatic coordinates aspects of the invention may be best understood from a consideration of FIGS. 16–30 and the following discussion. In contrast to the conventional cross-roll table which moves in two planes, in the present invention the base table 23 together with the clamping table 20 moves only in one plane, namely, by means of frame-shaped ball bearings 36, 37 which can move freely in any direction (FIGS. 16–20). The base table 23 can be fixed in any position by means of two tiltable magnetic plates 34. Outside the periphery of the base table there are located two angularly positioned guide rails 28 and 28a. Guide rail 28 is fastened on angle 29, while the second rail 28a is fastened on the bottom plate 46. On the same bottom plate 46 rests also the lower roll table to which is tensionally connected two round magnetic plates 34 by means of spring plate 35.

A longitudinal rail 24 is in parallel connection with the base table 23. Below the longitudinal rail 24 are located four rollers or ball bearings 25 to serve as guidance stops (see FIGS. 16 and 19). Accordingly, the base table 23 is guided by the guidance rail 28 in the direction of the Y-axis. The angle 29 which is connected with the guide rail 28 is also guided with rollers 25 along the lower guide means 28a in the direction of the X-axis. Below the longitudinal rail 24 are located two additional ball bearings 26 at a corresponding distance, which ball bearings 26 glide on the guide rail 28, while the frame-shaped ball bearings 36, 37 are located below the base table 23. The total forms a coordinate floating table which can be fixed in any position using the tiltable magnetic plate 34. At the front side of the table there is located a digital indicator instrument 27, which is connected with the longitudinal rail 24, and which transmits the linear length of the base table 23 in the direction of the Y-axis as a digital indication. Below the angle 29 is located the identical digital indicator which transmits the linear length in the direction of the X-axis.

This coordinate-floating-table is tensionally guided by the two guide rails 28 or 28a by means of four ball bearings 25, constituting a so-called zonal guide system per coordinate axis. This operates in such a manner that an area of each guide rod 28, 28a is guided by means of the ball bearings 25 having a fixed pin, while another area of each said guide rod is guided by means of the ball bearings having the tensional eccenter pins 24, 24a. Thus, only one area must function in a highly precise manner as a fixed guide means. By contrast, the prior art cross-table guide systems had to work in a precise manner at from four to eight areas, and, in addition, required a certain amount of play in order to operate smoothly. The new tensional system of the present invention is naturally absolutely free of play, since any unevenesses in the fixed guide areas are balanced out by means of the tensioning in the tension guided areas.

The automatic coordinate device may be further explained with reference to FIGS. 21-30 as follows. The workpieces to be measured are mostly without measuring precision stop areas. One can place the coordinate zero line of the workpiece by measuring by eye onto the stop plate but some error is likely to occur. A correction is therefore necessary. In accordance with the objects of the instant invention, this error in positioning the workpiece is removed by correcting the table position substantially as follows. On the clamping table 20 are located a multitude of selectable and affixable coordinate-centers, i.e., boreholes. On the base table 23 are also located a number of selectable and affixable coordinate centers. The coordinate centers are zero-points or starting points for the coordinate-measuring. According to the design of the workpiece, a suitable borehole is chosen as the measuring starting point and, afterwards, by means of a pin or a set-screw, the desired starting hole is selected in the clamping plate and pinned in the base table, so that both clamping plate and base table can be rotated with respect to each other to a small extent only. The clamping plate 20 is then moved upwards and downwards on the base table 23 via a lever system and control member 70-84 (FIGS. 27-28). As a result the plate is movable once around the pinned center of the starting hole in a floating condition for angle-correction of the workpiece, after which it is then again affixed to the base table after the correction is completed. The lever system consists of a lever 70 which is tiltably positioned by means of a plug 72 on a platform 71, which is fastened on the base plate 23. At the frontal area of lever 70 are located two roller systems 73, 74 which cooperate with the roller systems 75, 76 located in the cross-position on the clamping plate 20. The upwards and downwards movements are controlled by two knee-lever systems (or eccenters) which are arranged at the left and the right side of the table and are connected with pull rod 84 in such a manner that a lateral flexure of the lever system is achieved by means of pushing the push rod 85, causing the levers together with the rollers to be pushed upwards, so that the clamping plate is placed in a floating position. After correction of the angle error, the push rod 84 is again pulled outwards, whereby the extension of the lever is made, and the end portion of lever 70 is pressed on the foot 20a of the clamping table.

A typical correction of the angle error of a workpiece may be made as follows: During the clamping of the workpiece, care must be exercised so that the zero point of the workpiece complies precisely with the selected coordinate starting point, which can be seen in the digital indicator. Then a second reference point or reference line, for example a borehole or an edge etc. is established by means of a measuring spindle, or is registered. The table is now lifted to an extent until the actual measurement appears in the digital indicator, then the table can at once be fixed. The actual measurement represents the distance shown in the drawing or plan between the reference point and the zero point. For example, when a borehole is selected as reference point, and the distance from the zero line to the borehole is 8 mm, then the number 8 must appear on the digital indicator and the table must be fastened. The correction process is thereby readily accomplished without any tiring justification or calculational work.

FIGS. 22 to 25 show a further embodiment of the instant invention for pinning the clamping plate 20 to the base table 23 whereby a much larger number of predetermined starting centers can be obtained with few tapholes. No fixing boreholes are placed on the clamping plate 20, but only threaded holes, which are for the purpose of fastening the centering pin carrier 60. The centering pin carrier 60 is fastened on the clamping plate at any selected point by means of screws 60a. The centering pin 61 may be inserted at various points on the carrier 60, so as to obtain a number of variations. A fixing bridge device 62 is provided for receiving said pin, and is provided with a series of boreholes 64. Bridge device 62 may be fastened at a desired point on the frame of the base table 23 by means of screws. As soon as the centering pin 61 rests in a borehole 64 of the fixing bridge device 62, this represents the selected coordinate starting point or zero point, according to which also the zero point can be established. FIG. 26 shows how many starting centers can be selected by means of this system.

As a universal measuring machine, the machine must naturally be useful also to solve all related problems which are needed for obtaining such precision. The measuring machine of the present invention represents, simultaneously, a positioning table and can as well be combined with normal bore-machines. In order not to lose the precise positioning value, an apparatus for exact precision guidance for the borer has been developed. The measuring machine of the invention is provided with a tiltable or pivotable sleeve 50 (FIG. 20) for one of the centering devices of FIGS. 1–15 including a measuring spindle which is provided with a tensionable borehole so as to be able to receive exchangeable bushing holders 54 (FIG. 21). The bushing holder is provided with inner boreholes of various sizes for the purpose of adaptation to commercial bushings.

In order to enable an election of the coordinate center at any random point, a novel fastening (or mounting) system for the workpiece to be measured, has been invented, a novel removable T-groove 22 (FIG. 27), which—being always adaptable to the workpiece—has a great adjustability factor and can obtain much greater chuck capacities.

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

I claim:

1. Apparatus for precisely positioning a workpiece having a zero line relative to a pair of intersecting reference axes using first and second physically identified workpiece reference points positioned at known locations relative to the workpiece zero line, comprising
   (a) a clamp plate defining a predetermined pattern of clamp plate reference points;
   (b) work clamping means for mounting the workpiece on said clamp plate in a predetermined position in which the first workpiece reference point is in precise alignment with a selected one of said clamp plate reference points;
   (c) base means for supporting said clamp plate for translational movement of said clamp plate along the pair of intersecting measurement axes, said base means defining a pattern of base means reference points corresponding on a one-to-one basis with the pattern of clamp plate reference points;
   (d) mounting error correction means for bringing the zero line of the workpiece into a known position relative to the two intersecting measurement axes by correcting any rotational error in mounting of the workpiece relative to said base means, said mounting error correction means including
      (1) bearing means for mounting said clamp plate relative to said base means in a manner to permit universal uniplanar movement relative to said two intersecting measurement axes,
      (2) pinning means for pinning said clamp plate to said base means in a manner to permit only rotational movement within the plane of uniplanar movement defined by said bearing means about a rotational axis passing through said selected one clamp plate reference point with which the first workpiece reference point is precisely aligned,
      (3) holding means for operating in a first position to prevent said clamp plate from rotating relative to said base means and for operating in a second position to permit said clamp plate to rotate about the rotational axes defined by said pinning means while being supported by said bearing means,
      (4) measurement reference defining means for defining a measurement point, said measurement reference defining means including a reference point indicator physically alignable with the workpiece reference points when the workpiece is clamped to said clamp plate by said work clamping means, and
      (5) displacement measurement means for measuring the displacement of said base means along the pair of intersecting measurement axes whereby rotational error in the mounting of the workpiece may be corrected by (1) aligning said reference point indicator with the first workpiece reference point after the workpiece is clamped to said clamp plate by said work clamping means and said clamp plate is pinned to said base means by said pinning means, (2) displacing said base means along the pair of intersection axes by the known relative displacement of said workpiece reference points, (3) rotating said clamp plate about the rotational axis defined by said pinning means when said holding means is in said second position to bring the second workpiece reference point into alignment with said reference point indicator, and (4) moving said holding means to said first position to hold said clamp plate and thus the workpiece in a fixed orientation relative to said base means.

2. Apparatus as defined in claim 1, wherein said clamp plate contains a predetermined pattern of threaded boreholes corresponding respectively with said pattern of clamp plate reference points.

3. Apparatus as defined in claim 2, wherein said clamp plate contains a predetermined pattern of threaded boreholes significantly less in number than said pattern of clamp plate reference points and wherein said pinning means includes a plurality of centering pin carriers and threaded fasteners, any one of which may be mounted on said clamping plate in a variety of positions by engaging said threaded fasteners into said threaded boreholes, each said centering pin carrier including a single centering pin positioned to coincide with one of the reference points defined by said clamp plate, said pinning means further including a bridge containing a plurality of centering pin receiving holes, said bridge including fastening means for fastening said bridge in a variety of different positions on said base means to cause one of said centering pin receiving holes to receive the centering pin of any one of said centering pin carriers regardless of where said carrier is mounted on said clamp plate even though the number of said centering pin receiving holes in said bridge is significantly less than the total number of base means reference points.

4. Apparatus as defined in claim 2, wherein said holding means includes at least one clamp member pivotally connected at one end with said base means and movable between an up position to allow free movement of said clamp plate relating to said base means and a down position to hold said clamp plate in a fixed position relative to said base means, said holding means further including a lever system for moving said clamp member from said up position to said down position.

5. Apparatus as defined in claim 4, wherein said hearing means includes cross-wise positioned rollers mounted on said clamp member.

6. Apparatus as defined in claim 2, wherein said work clamping means includes a multitude of removable T- groove blocks used as clamps for said clamp plate, which blocks are affixed in a chosen position on said clamp plate by means of screws.

7. Apparatus as defined in claim 1, wherein said base means includes X and Y coordinate axes and includes guide means having a single guide rod per each coordinate axis, one portion of each guide rod being supported by means of ball bearings having fixed pins and another portion of each said rod being supported by means of ball bearings having tensionable eccenter pins.

8. Apparatus as defined in claim 2, wherein said measurement reference defining means includes a rotatable lever, said rotatable lever having at one end portion thereof a tensionable borehole and a central axis locating means for locating the central axis of a borehole in the workpiece.

9. Apparatus as defined in claim 8, wherein said central axis locating means includes
 (a) a lid for seating over and extending beyond the borehold, said lid contains a central opening;
 (b) a centering spindle having a tapered end and being mounted for sliding movement through said central opening of said lid to cause said tapered end to enter into the borehold; and
 (c) centering assembly means supported on said lid and extending at least partially into the borehole between the tapered end of said centering spindle and the interior sidewall of the borehole in a manner to cause the central axis of said centering spindle to be aligned with the central axis of the borehole, said centering assembly including at least three lever assemblies positioned equal angularly around the central axis of said centering spindles, each said lever assembly including at least one lever having a spherical end portion for contacting, on one side, the interior surface of a borehole having a diameter less than a predetermined amount, and for contacting, on the other side, said tapered end of said centering spindle, each said one lever being pivotally connected at its other end to said lid to permit said spherical end portions to be evenly pressed against the interior surface of the borehole.

10. Apparatus as defined in claim 9, wherein each said lever assembly includes a second lever positioned radially outwardly of said one lever, said second lever including a spherical end portion for contacting, on one side, the interior surface of a borehole having a diameter greater than said predetermined amount, and for contacting, on the other side, said one side of said spherical end of said first lever, each said second lever being pivotally connected at its other end to said lid to cause said spherical end portions of said second levers to be evenly pressed against the interior surface of the borehole.

11. Apparatus as defined in claim 10, wherein the radial extent of said spherical end portions of said first levers within the borehole is greater than the radial extent of said spherical end portions of said second levers.

12. Apparatus as defined in claim 10, wherein the radial extent of said spherical end portions of said first levers within the borehold is less than the radial extent of said spherical end portions of said second levers.

13. Apparatus as defined in claim 10, wherein said spherical end portions are formed by balls.

14. Apparatus for locating the central axis of a circular borehole contained in a workpiece, comprising
 (a) a lid for seating over and extending beyond the borehole, said lid containing a central opening;
 (b) a centering spindle having a tapered end and being mounted for sliding movement through said central opening of said lid to cause said tapered end to enter into the borehole; and
 (c) centering assembly means supported on said lid and extending at least partially into the borehole between the tapered end of said centering spindle and the interior sidewall of the borehole in a manner to cause the central axis of said centering spindle to be aligned with the central axis of the borehole, said centering assembly including at least three lever assemblies positioned equal angularly around the central axis of said centering spindle, each said lever assembly including at least one lever having a spherical end portion for contacting, on one side, the interior surface of a borehole having a diameter less than a predetermined amount, and for receiving, on the other side, said tapered end of said centering spindle, each said one lever being pivotally connected at its other end to said lid to permit said spherical end portions to be evenly pressed against the interior surface of the borehole.

15. Apparatus as defined in claim 14, wherein each said lever assembly includes a second lever positioned radially outwardly of said one lever, said second lever including a spherical end portion for contacting, on one side, the interior surface of a borehole having a diameter greater than said predetermined amount, and for contacting, on the other side, said one side of said spherical end of said first lever, each said second lever being pivotally connected at its other end to said lid to said spherical end portions of said second levers to be evenly pressed against the interior surface of the borehole.

16. Apparatus as defined in claim 14, wherein the radial extent of said spherical end portions of said first levers within the borehole is greater than the radial extent of said spherical end portions of said second levers.

17. Apparatus as defined in claim 15, wherein the radial extent of said spherical end portions of said first levers within the borehole is less than the radial extent of said spherical end portions of said second levers.

18. Apparatus as defined in claim 15, wherein said spherical end portions are formed by balls.

* * * * *